Feb. 21, 1956
A. ARNEJO
2,735,916
SWITCH FOR CONTROL SYSTEM OF IGNITION
AND STARTER OF MOTOR VEHICLES
Filed June 3, 1953
2 Sheets-Sheet 1
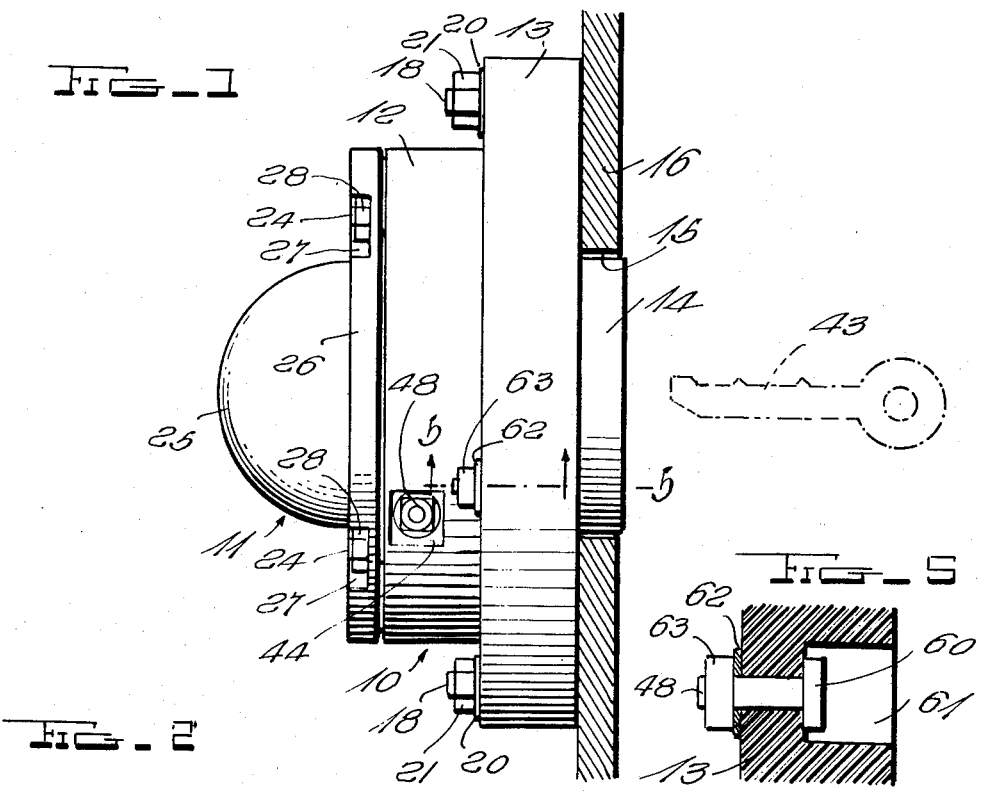
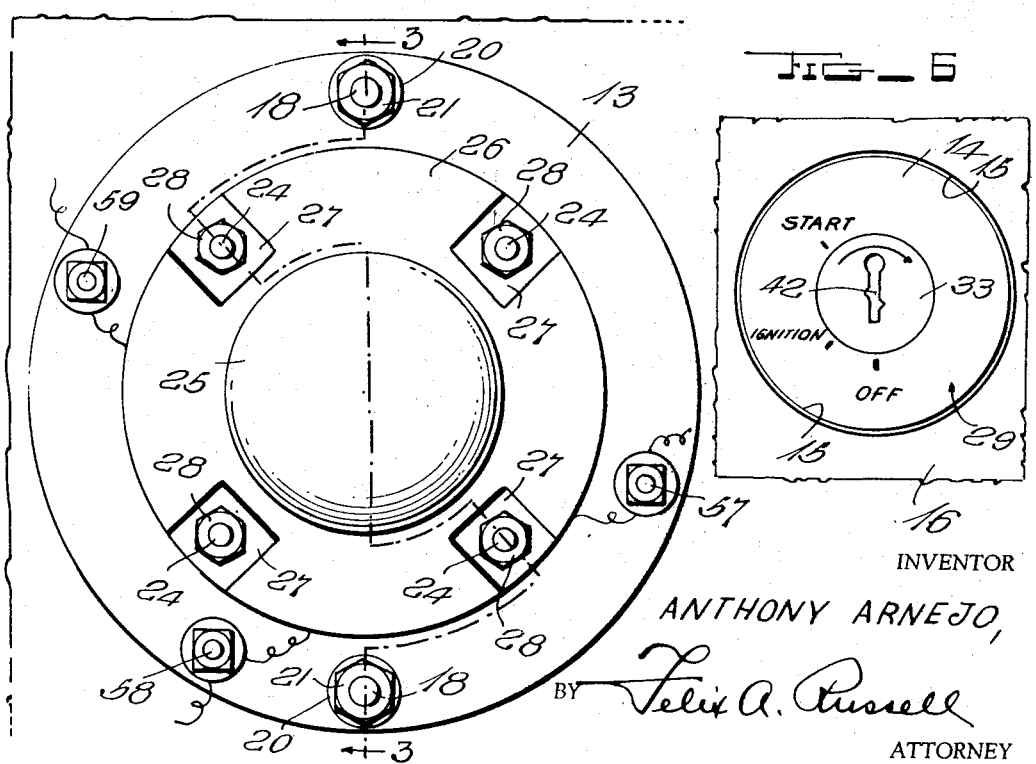
INVENTOR
ANTHONY ARNEJO,
BY Felix A. Russell
ATTORNEY

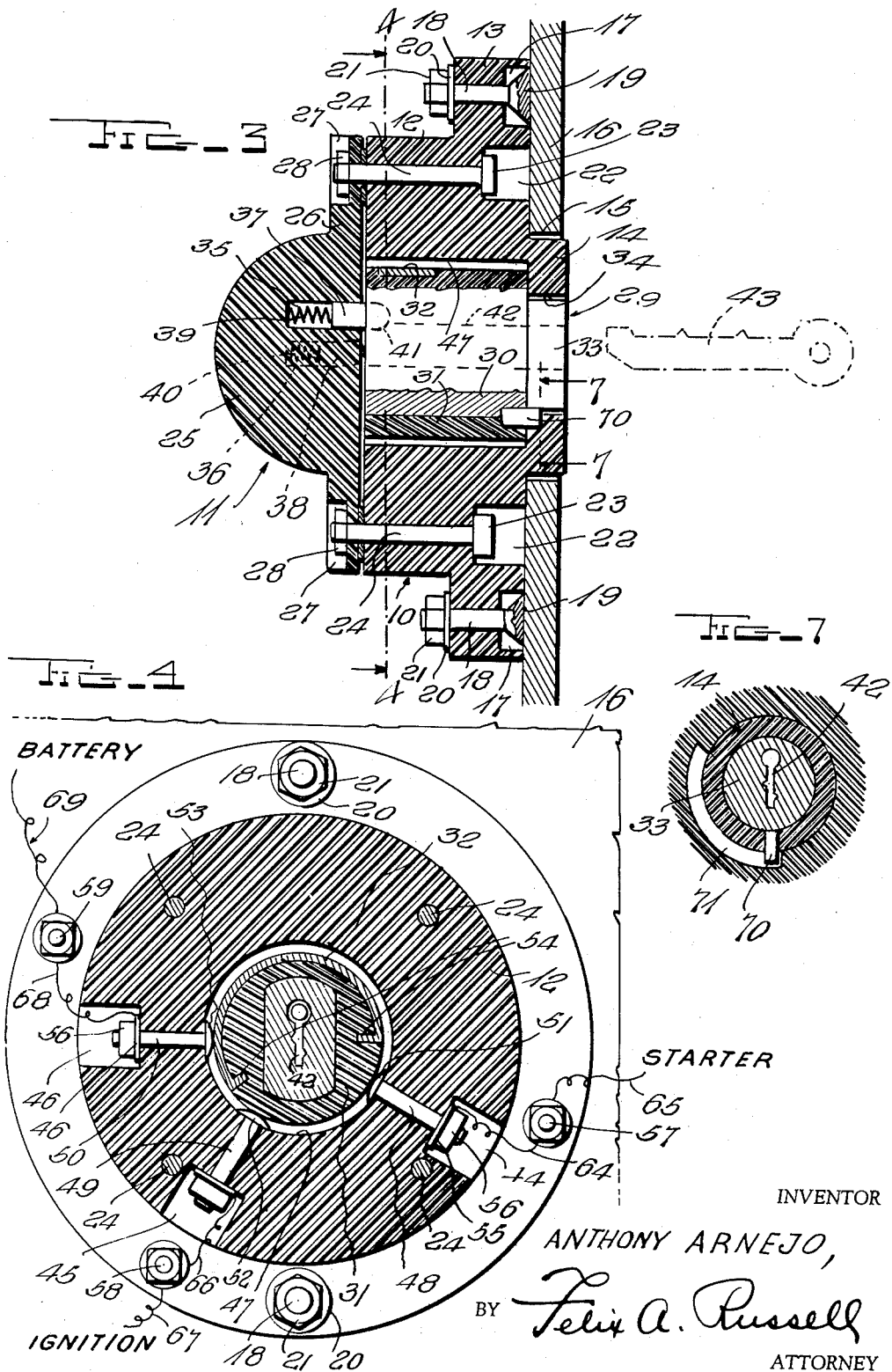

United States Patent Office 2,735,916
Patented Feb. 21, 1956

2,735,916

SWITCH FOR CONTROL SYSTEM OF IGNITION AND STARTER OF MOTOR VEHICLES

Anthony Arnejo, Detroit, Mich.

Application June 3, 1953, Serial No. 359,407

1 Claim. (Cl. 200—155)

The present invention relates to a switch for control system of ignition and starter of motor vehicles and it consists in the combinations, constructions and arrangements of parts herein described and claimed.

Generally the present invention constitutes an improvement upon my co-pending applications entitled "Control System for Automobile Headlights," filed October 9, 1952, and bearing Serial No. 313,939 and "Switch Construction for Control System for Automobile Headlights," filed November 14, 1952, and bearing Serial No. 320,419, now Patent No. 2,714,138, dated July 26, 1955. The present invention constitutes a lock-controlled switch for the ignition and starter of an automobile and includes a compact two-part casing comprising a body portion and a cover. The casing is adapted to be attached to the rear of an automobile dashboard and the body portion thereof includes a reduced cylindrical member which is adapted to protrude through a circular opening in the dashboard with its outer surface flush with the outer surface of such dashboard. The necessary wiring has been greatly simplified and the entire device may be quickly and easily installed in an automobile with a minimum amount of labor and a maximum of efficiency. Various novel features will be brought out in the specification.

It is accordingly an object of the invention to provide a simple, compact and easily installed switch for controlling the ignition system and the starter of an automobile.

Another object of the invention is to provide a device of the character set forth which is simple in construction, inexpensive to manufacture and yet effective and efficient in use.

Another object of the invention is to provide, in a device of the character set forth, novel means for latching a lock cylinder forming a part of the invention in selected positions.

Another object of the invention is the provision, in a device of the character set forth, of a novel switch forming a part of the invention.

A further object of the invention is to provide, in a device of the character set forth, novel fastening means whereby bolts of minimum length may be used.

Other and further objects of the invention will become apparent from a reading of the following specification taken in conjunction with the drawings, in which:

Figure 1 is a side elevational view of an embodiment of the invention,

Figure 2 is a rear elevational view thereof,

Figure 3 is a sectional view taken along line 3—3 of Figure 2,

Figure 4 is a sectional view taken along line 4—4 of Figure 3,

Figure 5 is an enlarged sectional view taken substantially along line 5—5 of Figure 1, Figure 6 is a front elevational view, and Figure 7 is a sectional view taken substantially along line 7—7 of Figure 3.

Referring more particularly to the drawings, there is shown therein a casing having a body generally indicated at 10 and a cover generally indicated at 11. The body 10 comprises a main body portion 12 which is circular in vertical cross sectional area and which is provided with an annular enlarged portion 13 at its inner end. The body 10 is centrally provided with a circular reduced portion 14 which is integrally formed therewith and which is adapted to protrude through a circular opening 15 formed in a dashboard 16 of an automobile.

A pair of recesses 17 are formed in the rearward face of the annular portion 13 in diametrically opposed positions therein. A pair of bolts 18 extends through the annular portion 13 and each is provided with a head 19 which is welded to the rear side of the dashboard 16, such heads being adapted to be positioned in the recesses 17. Each of the bolts 18 is provided with a washer 20 and nut 21. The bolts 18 are adapted to maintain the entire assembly upon the rear face of the dashboard 16 in such manner that the exposed surface of the portion 14 lies in substantially the same plane as the forward side of the dashboard 16.

The main body portion 12 is provided with four circumferentially spaced recesses 22 in its inner face in each of which is positioned the head 23 of a bolt 24. The cover 11 is centrally provided with a hemi-spherical body 25 and an integrally formed outwardly extending annular flange 26. The flange is provided in its outer face with four circumferentially spaced recesses 27 and the bolts 24 each extend into one of the recesses 27 and have mounted thereon a retaining nut 28 which lies within such recess.

A lock cylinder is generally indicated at 29 and is provided with a body 30 embedded in a cylindrical shell 31 of plastic material which latter shell 31 has embedded in its outer periphery an arcuate contacting band 32 of copper or the like. The lock 29 is provided with a reduced cylindrical key plate 33 which extends through a centrally disposed circular opening 34 in the member 14 and which has its outer face substantially in the same plane as the outer face of the member 14 and the dashboard 16.

The body 25 has extending from its inner face a pair of cylindrical recesses 35 and 36 which are positioned eccentrically with respect to the member 29. In each of the recesses there is slidably mounted a piston 37 and 38, respectively. A compression spring 39 and 40, respectively, is mounted in each of the recesses 35 and 36 and each is adapted to urge its respective piston forwardly to engage in a rounded opening 41 formed in the outer face of the key block 30. The key block is provided with a longitudinally extending key slot 42 for the reception therethrough of a conventional key 43. The key slot 42 communicates with the lower portion of the opening 41 at the rearward end portion of such slot.

Extending radially inwardly in the body portion 12 are three recesses 44, 45 and 46. The body 12 is centrally provided with a cylindrical opening 47 for the revoluble reception therein of the shell 31 and bolts 48, 49 and 50 extend radially from the opening 47 through the body 12 and into the recesses 44, 45 and 46, respectively. The bolts 48, 49 and 50 are respectively provided at their inner ends with contact heads 51, 52 and 53 which heads are in contact with the outer periphery of the shaft 31 and/or the band 32 depending upon the position of the member 29 with respect to the body 12. The free ends of the band 32 are inturned and embedded in the shell 31 as indicated at 54.

Each of the bolts 48, 49 and 50 is provided at its outer end with a washer 55 and nut 56.

Three binding posts 57, 58 and 59 are mounted in the annular portion 13 of the body 10 at points adjacent the bolts 48, 49 and 50, respectively and each is provided with a head 60 positioned at the inner end of a recess 61 extending into the forward face of the member 13 and each is provided with a washer 62 and nut 63.

A wire 64 interconnects the bolt 48 with the binding post 57 and a wire 65 connects the binding post 57 to the starter (not shown) of the automobile in which the device is installed. A wire 66 interconnects the bolt 49 with the binding post 58 and, in turn, a wire 67 connects the binding post 58 with the ignition system of such automobile. A wire 68 connects the post 59 with the bolt 50 while a wire 69 connects the post 59 with the battery of such automobile.

In operation, it will be apparent that when the key 43 is inserted into the slot 42 that the outer end of the key will impinge against the piston 37 to move the same into the recess 35 against the action of the spring 39 whereupon the key block and its associated shell 31 together with the band 32 may be turned. Assuming that the key is turned in a clockwise direction as viewed in Figure 6, for example, it will be apparent that when it reaches the relative position indicated by the word "ignition" on the face thereof that the band 32 will be moved in a counterclockwise direction as viewed, for example, in Figure 4 in such manner that the band 32 will now be in contact with the heads 52 and 53 of the bolts 49 and 50, respectively. This will complete an electrical circuit which includes the battery and the ignition system through the wire 69, binding post 59, wire 68, bolt 50, head 53, band 32, head 52, bolt 49, wire 66, binding post 58 and wire 67. Further turning the block in the same direction, that is to say in a clockwise direction as viewed in Figure 6, it will be apparent that the band 32 will be moved to a further extent in a counterclockwise direction as viewed in Figure 4. When the block has assumed the relative position indicated by the word "start" in Figure 6, it will be apparent that the band 32 will now electrically interconnect the heads 53 and 51 thus completing an electrical circuit including the battery, the wire 69, the binding post 59, the wire 68, the bolt 50, the bolt head 53, the band 32, the head 51, the bolt 48, the wire 64, the binding post 57, the wire 65 and the aforesaid starter.

It will be apparent that when the starter has been used to start the engine of the automobile that the block may be returned to its "ignition" position since the starter will no longer be needed whereas the ignition system will indeed be needed to continue the operation of the engine. It will also be apparent that in the initial position of the member 29 that the piston 37 will be positioned in the opening 41 to prevent rotary movement of the member 29. When, however, the key 43 is inserted in the slot 42 as aforesaid, the piston 37 will be moved rearwardly to allow the rotation of the member 29. The piston 38 is so positioned that it will enter the opening 41 when the member 29 is in the "ignition" position. Hence, it will be apparent that after the starter has been utilized as above described that the member 29 may be returned to its "ignition" position and be latched in such position by means of the action of the piston 38 and the compression spring 40. Likewise it will be apparent that the provision of the various recesses such as the recesses 22, 44 and 27, allows the use of much shorter bolts than would otherwise be necessary if the body 10 were not so provided. Excessive rotation of the member 29 is prevented by the provision of a dog 70 which is affixed to the key block 30 adjacent the forward end thereof and which projects radially therefrom into an arcuate slot 71 formed in the inner face of the member 14.

While but one form of the invention has been shown and described herein, it will be readily apparent to those skilled in the art that many minor modifications may be made without departing from the spirit of the invention or the scope of the appended claim.

What is claimed is:

A device of the character described comprising, in combination with an automobile dashboard having a circular opening therein, the provision of a casing, means for attaching said casing to the rear of said dashboard, an integrally formed forwardly extending cylindrical portion for said casing adapted to extend into said circular opening to lie flush with said dashboard, a cover affixed to the rear of said casing, a lock cylinder revolubly mounted in said cylindrical portion and having a key passage therethrough, an arcuate band of electrically conductive material embedded in the outer periphery of said shell, a battery contact member, an ignition contact member, and a starter motor contact member extending successively and radially into said casing to frictional selective contact with said shell and band, said band having normal contact only with said battery contact member and adapted, when moved in one direction, to first additionally contact said ignition contact member, and upon still further movement in the same direction to contact all three of said contact members.

References Cited in the file of this patent

UNITED STATES PATENTS

| | | |
|---|---|---|
| 1,748,255 | Tibbetts | Feb. 25, 1930 |
| 1,899,350 | Norviel | Feb. 28, 1933 |
| 1,913,617 | Smith | June 13, 1933 |
| 2,170,154 | Moore | Aug. 22, 1939 |
| 2,215,162 | Scott | Sept. 17, 1940 |
| 2,279,623 | Jacobi | Apr. 14, 1942 |
| 2,662,131 | Cerna et al. | Dec. 8, 1953 |